Figure 1:
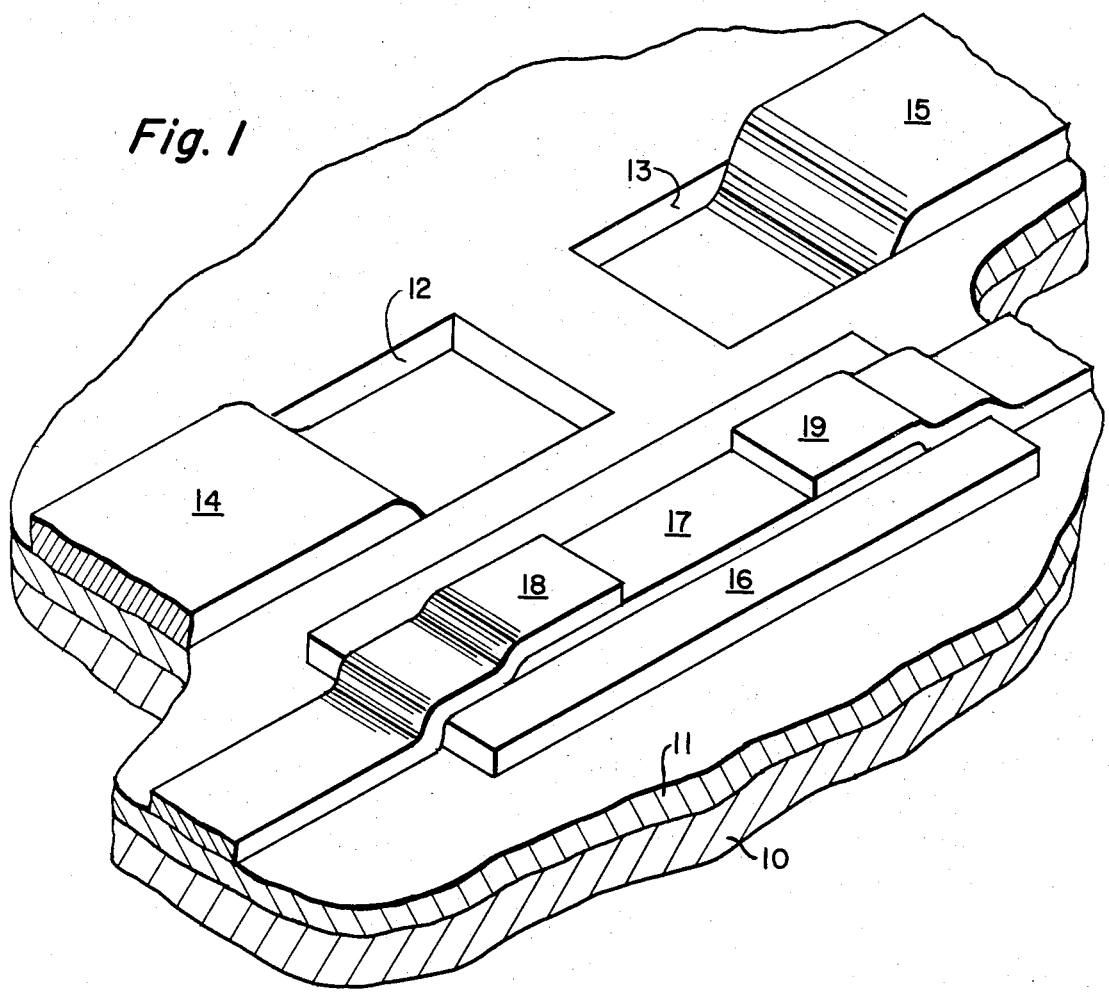

United States Patent [19]
Wolter

[11] 3,828,606
[45] Aug. 13, 1974

[54] METHOD FOR DETERMINING THERMAL FATIGUE OF ELECTRONIC COMPONENTS

[75] Inventor: Allan Roy Wolter, Seattle, Wash.

[73] Assignee: The Boeing Company, Seattle, Wash.

[22] Filed: Dec. 6, 1972

[21] Appl. No.: 312,482

[52] U.S. Cl. .............. 73/15 R, 73/88.5, 73/362 AR
[51] Int. Cl. .......................................... G01n 25/00
[58] Field of Search ... 73/15, 15.4, 15.6, 91, 88.5 R, 73/362 AR; 324/65 R; 338/2, 6

[56] References Cited
UNITED STATES PATENTS

| | | | |
|---|---|---|---|
| 3,186,228 | 6/1965 | Lever et al. | 324/65 |
| 3,272,003 | 9/1966 | Harting | 73/91 |

Primary Examiner—Herbert Goldstein
Attorney, Agent, or Firm—Brown, Murray, Flick & Peckham

[57] ABSTRACT

A method for determining thermal fatigue of electronic circuits and parts therefor includes the use of a thin-film thermal strain gage made from metals including metal alloys which are deposited on a preselected substrate by vacuum evaporation, sputtering, co-evaporation or similar techniques. The substrate material is selected in relation to the resistor gage material in such a manner as to create a predetermined mismatch of thermal expansion coefficient. The resistivity of the gage is responsive to a spectrum of temperature changes and reveals the progress toward ultimate failure of the circuit. The gage may take the form of a narrow strip-like assembly which is arranged immediately adjacent to an electronic device, component or other parts subject to failure due to thermal fatigue.

15 Claims, 2 Drawing Figures

METHOD FOR DETERMINING THERMAL FATIGUE OF ELECTRONIC COMPONENTS

BACKGROUND OF THE INVENTION

This invention relates to thermal fatigue gages of the type employing thin-film resistors which can be fabricated as an integral part of an electronic circuit or mounted at a strategic position in electronic circuitry to monitor thermal experiences of electronic parts or their interconnections, etc.

Many metal or non-metal parts when subjected to repeated variations will fail by fatigue due to the repeated mechanical flexure which accompanies the temperature changes. Operational microelectronic parts, for example, are composed of a variety of metal and nonmetal structures which can break or crack after exposure to repeated thermal fluctuations rendering the electronic circuitry inoperable. Because the modes of failure in microelectronic, integrated and many other types of electronic circuits are many, it is necessary to design a gage for response to the spectrum of damaging thermal fatigue to match the way in which a point of potential failure accumulates its thermal fatigue damage. Integrated circuits are known to fail, for example, due to work-hardening of aluminum interconnections between the component parts, In hybrid and monolithic integrated circuits, metalization interconnecting patterns and wire bonds are used to interconnect the individual connectors, transistors, diodes, resistors, capacitors, etc., making up such circuits. It would be highly desirable to record the thermal experiences of such electronic parts and support structures for the purpose of predicting the extent of accumulated damage so that the device or the entire circuit could be replaced prior to a catastrophic failure due to the loss of the electrical circuit function.

Conceivably, a thermocouple might be placed at the point of potential failure to continuously sense thermal variations. An analysis of the thermal variations of the part taken over a long period of time, would allow replacement of the part prior to failure assuming that the tolerance of the part to thermal stresses was known. Such a thermocouple system would be very complex since the thermal data must be integrated and analyzed in a special way for each structure. This renders it highly impractical since the thermocouple system would be required to be in continuous operation during the life of the electronic part.

The general concept of resistor-type gages which generate a permanent resistance change as a function of fatigue experience is not new in the art. One form of fatigue life gage is illustrated and described in U.S. Pat. No. 3,272,003 which issued in the name of D. R. Harding. This device utilizes a grid of conductive material in the form of a foil, film or wire mounted on a structure to be tested wherein the change in resistance or temperature coefficient of resistance of the grid material is utilized in determining the fatigue life of the structure. The change in resistance or temperature coefficient will be directly related to the change in fatigue life remaining in the gage and in the base structure, so that at any time an indication of the remaining fatigue life in the base structure may be obtained by measuring the resistance of the gage element.

This invention relates to a gage which operates on somewhat the same basic principle as a mechanical fatigue life gage by employing a concept that a change in the resistance of the gage resistance indicates fatigue experience. The thermal fatigue gage for electronic parts, according to this invention, however, differs both with respect to the employment of the gage and the gage construction parameters. The present invention is specifically related to a method of determining thermal fatigue experiences of electronic circuits which undergo repeated thermal excursions because of the ambient temperature and heat generated by the circuit components.

SUMMARY OF THE INVENTION

It is an object of the present invention to provide a thermal fatigue gage to measure thermal fatigue experience of electronic circuits and parts thereof by forming a thin-film resistor gage on a solid substrate so as to create a predetermined mismatch of thermal expansion properties of the gage and the substrate.

It is a further object of the present invention to provide a thermal fatigue gage having a novel configuration to permit the matching of the thermal fatigue characteristics of the gage to the fatigue characteristics of the electronic components or point of possible failure to be monitored.

Another specific object of the present invention is to provide the thermal fatigue gage employed to predict thermal fatigue failure of interconnections of the type on a discrete diffused semiconductor device or on a monolithic semiconductor integrated circuit by arranging the gage in juxtaposition to the interconnection in a manner that the gage experiences the same thermal excursions as the point of potential failure.

According to the present invention, there is provided a method of determining the fatigue experience of electronic circuits and parts thereof comprising the steps of selecting a thin-film resistor gage material having an irreversible strain sensitivity matching the spectrum of susceptibility of thermal damage to the circuit, utilizing a substrate material to support the gage material having a predetermined mismatched thermal expansion coefficient from the thermal expansion coefficient of the fatigue gage material, forming a thermal fatigue gage by a thin-film deposit of resistor gage material upon the substrate material, arranging the thermal fatigue gage at a point of potential failure in the electronic circuit, and measuring the resistivity of the gage to represent the progress toward failure of the electronic circuit.

Figure 2:
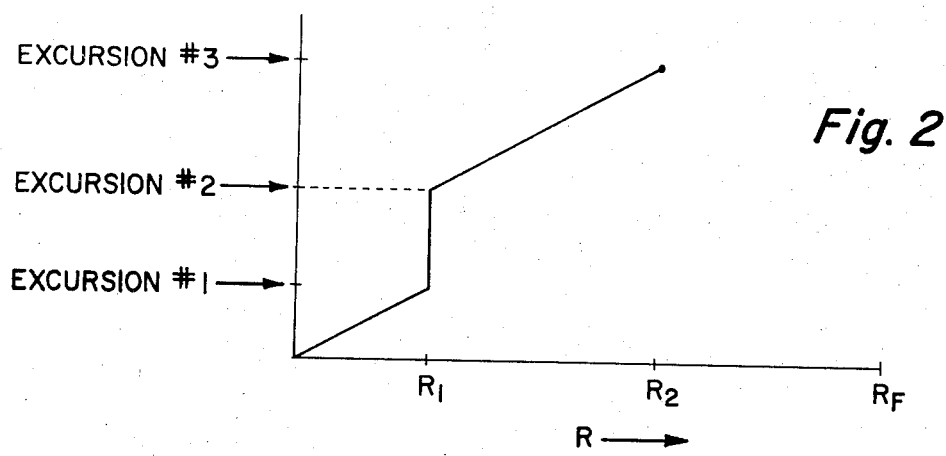

These features and advantages of the present invention as well as others will be more fully understood when the following description is read in light of the accompanying drawing in which:

FIG. 1 illustrates one embodiment of a thermal fatigue gage employed to predict failure of an interconnection member of a diffused planar semiconductor diode; and FIG. 2 is a graph to typically represent the resistivity change of the gage with respect to number of thermal excursions above a threshold temperature.

The microelectronic circuit shown in FIG. 1 includes a substrate 10 which is typically formed from a silicon material. A silicon dioxide or nitride passivation layer 11 is arranged on the substrate. Window openings 12 and 13 are provided in the layer 11 to expose a diffused device such as a diode, not shown, supported in the substrate 10. The diode is electrically connected to conductor strips 14 and 15 which pass along the upper surface of the layer 11 and project through the windows 12 and 13. These conductor strips are typically formed from an aluminum film.

The thermal fatigue gage, according to the present invention, includes a substrate layer 16 arranged in a juxtaposed relation with the window 12 and the electrical conductor 14. A thin-film thermal fatigue material 17 is deposited on the substrate 16. The thin-film fatigue gage illustrated by FIG. 1 has the form of a rectangular shape. Electrical conductor strips 18 and 19 overlie the terminal ends of the thermal fatigue gage whereby a resistivity reading of the gage may be taken at selected intervals of time through the use of standard measuring devices such as ohm-meters or potentiometers.

The circuit illustrated in the drawings represents but one use of a thermal fatigue gage in the field of electronics to predict failure of circuits. In this example, the lead 14, often in the form of etched aluminum films, becomes work-hardened, cracked or otherwise weakened under the influence of thermal fluctuations experienced over a long period of operation. Since this weakening does not normally affect the operation of the circuit until sudden fracture of the interconnection occurs, the thermal fatigue thin-film gage provides the agency to record and integrate the thermal excursion history of the lead. This enables prediction of the circuit's ultimate failure and replacement prior to that failure. It is important to note that the gage is located close to the point of potential failure so that it experiences the same thermal fluctuations due to ambient temperature changes and internal heating at the expected point of failure. The electrical conductors 18 and 19 of the resistor gage may be connected to other leads to permit remote periodic measurements of the gage's resistance and determination of the progress toward failure of the interconnection. The gage can be made as an integral part of the circuit. The graph illustrated by FIG. 2 represents the typical manner in which the gage undergoes an increase in its resistivity in response to temperature excursions. In this example, the gage and its associated failure point first experience a temperature excursion No. 1 in which a moderate amount of fatigue damage is introduced into the structure. In response to excursion No. 1, the gage resistance increases to $R_1$. The system then experiences a second thermal excursion No. 2 which is small and by which negligible damage is introduced. In response to excursion No. 2, the gate does not change resistance. Similarly when the system experiences a large thermal excursion such as excursion No. 3, the gage increases in resistance to $R_2$, a large change in resistance. For each gage, there exists a resistance of failure, $R_F$, which reveals that the structure being monitored has experienced sufficient thermal excursions that it is in danger of catastrophic failure. When the gage resistance, $R_F$, is reached or exceeded, the device containing the structure should be replaced.

The processes used to form the gage may take the same form as those used for the formation of the circuit interconnections. These processes typically include film deposition followed by photolithographic processes to delineate gage geometry. Because the mode of failure in electronic circuits are many and the work-hardening of the aluminum interconnections discussed above is but one example, it is necessary to have a spectrum of gage characteristics to match the manner in which the point of potential failure accumulates damage. The gage, according to the present invention, accomplishes this by selecting one of a variety of types of material to form the gage film. Selecting one of a variety of processes for forming the gage will also yield the different gage characteristics. Heat-treating the gage film will desirably maintain its thermal stability. Conditions of pressure and temperature during the film depositions by evaporation, sputtering or co-evaporation may be selected within various limits. It is preferred to select the substrate 16, which may or may not be present depending on the gage response desired, as an electrical insulating material from one of a number of different materials to support the gage during its formation. The thickness, type and formation conditions of the substrate are other variables that provide different characteristics.

According to the present invention, a mismatch of thermal expansion coefficients is preselected to provide the thermal threshold and desired thermal response characteristic of the gage. Metal alloys are preferred for the gage film and three element alloy films give good results. For example, let it be assumed that a selected gage film material has a thermal expansion coefficient of $20 \times 10^{-6}/°C$ and will experience an appreciable irreversible change in its microscopic structure for any strain above $5 \times 10^{-4}$ in./in. If the substrate material on which the film is deposited has a very low thermal expansion coefficient, such as $0.3 \times 10^{-6}/°C$, which is a typical value of quartz, then the device will be sensitive to a temperature change as low as 25°C because $25°C = (5 \times 10^{-4} \text{ in./in.})/(20 \times 10^{-6}/°C.)$ By way of another example, if the same gage film material were deposited on a substrate with the thermal expansion coefficient of $10 \times 10^{-6}/°C$, the gage would then be sensitive to thermal variations above $(5 \times 10^{-4} \text{ in./in.})/[(20 - 10) \times 10^{-6}/°C]$. which equals 40°C. Electronic circuits of the type for use with the present invention function at ambient temperature below 150°C. These examples illustrate one manner by which gages with a variety of thermal threshold sensitivities may be fabricated using the same film material. The thermal fatigue gage may be fabricated in a variety of sizes, but it is particularly important that the thin-film resistor could be made a few ten thousands of an inch wide so that it can, if desired, be deposited as an integral part of or immediately adjacent to individual devices even in the most dense microelectronic circuitry. In view of the foregoing, the expression "thermal threshold sensitivity" describes a quantitative temperature fluctuation below which no resistance change will be experienced or produced in the fatigue gage itself.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A method of determining the fatigue experience of a thermal sensitive electronic circuit and the like comprising the steps of:

selecting a thermal fatigue material for a thin-film gage, said material having an irreversible strain sensitivity selected to correspond to the spectrum of thermal damage incurred by said circuit and part therefor, utilizing a substance material having a selected thermal expansion coefficient different from the thermal expansion coefficient of said thermal fatigue material, and forming a thermal fatigue thin-film gage by film deposits of said thermal fatigue material upon said substrate material to undergo resistivity changes in response to essentially the same thermal excursions as experienced by said thermal sensitive electronic circuit, determining the resistivity change of said thermal fatigue gage to reveal the progress toward failure of said circuit.

2. The method of claim 1 including the step of:
delineating the geometry of said thin-film gage by photolithographic means.

3. The method of claim 1 including the step of:
selecting an elevated temperature and superatmospheric pressure for depositing a film of said gage material upon said substrate material.

4. The method of claim 3 including the step of:
heat-treating the thin-film gage material after depositing upon said substrate material to maintain thermal stability of said gage.

5. The method of claim 4 wherein said forming a thermal fatigue thin-film gage includes depositing a gate film by metal evaporation.

6. The method of claim 4 wherein said forming a thermal fatigue thin-film gage include depositing a gage film by metal sputtering.

7. The method of claim 4 wherein said forming a thermal fatigue thin-film gage includes depositing a gage film by metal co-evaporation.

8. The method according to claim 1 wherein the difference between the thermal expansion coefficients of the gage material and substrate material produces a thermal threshold sensitivity less than 150°C.

9. The method according to claim 1 wherein said thermal fatigue material is further defined as a metal alloy.

10. The method according to claim 9 wherein said metal alloy is further defined as a three element alloy.

11. The method according to claim 1 including the step of arranging said thermal fatigue gage at a point of potential failure in said electronic circuit.

12. The method according to claim 11 wherein said arranging of the thermal fatigue gage at a point of potential failure further includes incorporating said fatigue gage as an integral part of electronic circuits.

13. The method of claim 11 where said resistivity change is determined by a resistance measurement taken at spaced location on said gage.

14. The method of claim 13 including the step of:
using electrical conductors at opposed ends of said thermal fatigue gage for determining said resistivity change.

15. The method of claim 14 wherein said electronic circuit is further defined to include a microelectronic circuit and said resistivity change is measured at points remote to said circuit.

* * * * *